(12) United States Patent
Gartside et al.

(10) Patent No.: US 7,401,359 B2
(45) Date of Patent: Jul. 15, 2008

(54) GENERATING MALWARE DEFINITION DATA FOR MOBILE COMPUTING DEVICES

(75) Inventors: Paul Nicholas Gartside, Milton Keynes (GB); Neil Andrew Cowie, Aylesbury (GB)

(73) Assignee: McAfee, Inc., Santa Clara, CA (US)

( * ) Notice: Subject to any disclaimer, the term of this patent is extended or adjusted under 35 U.S.C. 154(b) by 965 days.

(21) Appl. No.: 10/023,852

(22) Filed: Dec. 21, 2001

(65) Prior Publication Data

US 2003/0120951 A1    Jun. 26, 2003

(51) Int. Cl.
*G06F 21/02* (2006.01)
(52) U.S. Cl. .......................................... 726/22; 726/24
(58) Field of Classification Search .................. None
See application file for complete search history.

(56) References Cited

U.S. PATENT DOCUMENTS

| | | | |
|---|---|---|---|
| 4,724,521 A | 2/1988 | Carron et al. | 717/175 |
| 5,319,776 A | 6/1994 | Hile et al. | 726/24 |
| 5,440,702 A | 8/1995 | Brewer et al. | 712/223 |
| 5,440,723 A | 8/1995 | Arnold et al. | 714/2 |
| 5,452,442 A | 9/1995 | Kephart | 714/38 |
| 5,623,600 A | 4/1997 | Ji et al. | 726/24 |
| 5,832,208 A | 11/1998 | Chen et al. | 726/24 |
| 5,881,151 A | 3/1999 | Yamamoto | 726/24 |
| 5,896,566 A | 4/1999 | Averbuch et al. | 455/419 |
| 5,914,675 A | 6/1999 | Tognazzini | 340/989 |
| 5,948,104 A * | 9/1999 | Gluck et al. | 713/200 |
| 6,035,423 A | 3/2000 | Hodges et al. | 714/38 |
| 6,085,100 A | 7/2000 | Tarnanen | 455/466 |
| 6,123,737 A | 9/2000 | Sadowsky | 717/173 |
| 6,141,681 A | 10/2000 | Kyle | 709/206 |
| 6,192,237 B1 | 2/2001 | Clapton et al. | 455/422.1 |
| 6,266,774 B1 | 7/2001 | Sampath et al. | 726/24 |
| 6,269,456 B1 | 7/2001 | Hodges et al. | 714/38 |

(Continued)

FOREIGN PATENT DOCUMENTS

GB    WO 02/19067 A2 *    3/2002    ................. 713/200

OTHER PUBLICATIONS

"F-Secure Corporation Data Sheet" Published Jun. 12, 2001 as verified by the InternetArchive.http://web.archive.org/web/20010612235353/www.f-secure.com/wireless/palm/datasheet.pdf.

(Continued)

*Primary Examiner*—Gilberto Barron, Jr.
*Assistant Examiner*—Saoussen Besrour
(74) *Attorney, Agent, or Firm*—Zilka-Kotab, PC; Christopher J. Hamaty

(57) ABSTRACT

Malware definition data for mobile computing devices 2 is generated from master malware definition data 44 by selecting those classes of malware threat to which the mobile computing device is vulnerable and then selecting the matching malware items from within the master malware definition data. A PC 6 to which the mobile computing device may be connected is responsible for downloading an updated version of the master malware definition data for its own use and generates appropriate mobile computing device malware definition data for transfer to the mobile computing device when it is connected to the PC. The scanner programs of both the PC and the mobile computing device may be similarly updated.

37 Claims, 6 Drawing Sheets

U.S. PATENT DOCUMENTS

| | | | |
|---|---|---|---|
| 6,275,710 B1 | 8/2001 | Oinonen et al. | 455/466 |
| 6,301,668 B1 | 10/2001 | Gleichauf et al. | 713/201 |
| 6,347,375 B1 | 2/2002 | Reinert et al. | 726/24 |
| 6,357,008 B1 | 3/2002 | Nachenberg | 726/24 |
| 6,496,837 B1 | 12/2002 | Howard et al. | 707/200 |
| 6,577,920 B1* | 6/2003 | Hypponen et al. | 700/200 |
| 6,622,150 B1* | 9/2003 | Kouznetsov et al. | 707/200 |
| 6,683,860 B1 | 1/2004 | Forssell et al. | 370/329 |
| 6,711,686 B1 | 3/2004 | Barrett | 713/200 |
| 6,718,469 B2 | 4/2004 | Pak et al. | 726/24 |
| 6,728,547 B1 | 4/2004 | Frank et al. | 455/466 |
| 6,741,854 B2 | 5/2004 | Kuhn et al. | 455/419 |
| 6,792,543 B2 | 9/2004 | Pak et al. | 726/24 |
| 6,892,241 B2 | 5/2005 | Kouznetsov et al. | 709/229 |
| 7,171,690 B2 | 1/2007 | Kouznetsov et al. | 726/22 |
| 2002/0042886 A1* | 4/2002 | Lahti et al. | 713/201 |
| 2002/0124181 A1* | 9/2002 | Nambu | 713/200 |
| 2002/0124182 A1 | 9/2002 | Basco et al. | 713/200 |
| 2002/0159632 A1* | 10/2002 | Chui et al. | 382/168 |
| 2002/0168111 A1 | 11/2002 | Latva-Aho | 382/232 |
| 2003/0021280 A1 | 1/2003 | Makinson et al. | 370/401 |
| 2003/0022657 A1* | 1/2003 | Herschberg et al. | 455/414 |
| 2003/0036920 A1 | 2/2003 | Smith et al. | 705/1 |
| 2003/0074581 A1 | 4/2003 | Hursey et al. | 713/201 |
| 2004/0010579 A1* | 1/2004 | Freese | 709/223 |

OTHER PUBLICATIONS

"F-Secure Anti-virus for Palm OS" Reference dated Jun. 11, 2001 by the Internet Archive. Original reference at http://www.f-secure.com/wireless/palm.

"F-Secure Anti-virus for EPOC" Reference dated Feb. 15, 2001 by the Internet Archive. Original reference at http://www.f-secure/com/wireless/epoc.

"F-Secure Announces Worlds's First Anti-Virus Product For Wireless Information Devices" © Aug. 9, 2000 F-Secure Corp.

"F-Secure Anti-Virus for Pam OS Version 2.0 User's Guide" © 200/2001 F-Secure Corp.

"F-Secure Anti-Virus for Pocket PC User's Guide" © 200-2001 F-Secure Corp.

"Trend Mircor PC-cillin for Wireless 2.0 README.txt." © Jun. 26, 2001 Trend Micro Inc.

"PC-cillin for Wireless Version 2.0 User's Manual" © 2001 Trend Micro Inc.

"Trend Micro Offers Version 2.0 of Device-Resident Palm Wireless Antivirus Software for Free" © May, 16, 2001 Trend Micro Inc.

"Kypcera QCP 6035 Smartphone" http://the-gadgeteer.com/review/kyocera_qcp_6035_smartphone_review.

"Norton Antivirus for Windows 95/98 User's Guide" © 1990-1998 Symantec Corp.

"Norton Antivirus for Macintosh 7.0 User's Guide" © Nov. 15, 2000 Symantec Corp. Available at http:///www.symantec.com/techsupp/enterprise/products/navm_ent7/manuals.html.

"Nuts and Bolts of Notebooks" © Jan. 26, 2001 Tom's Hardware Guide. http://www.tomshardware.com/mobile/20010126/notebooks-01.html.

Definition of "daemon" provided by thefreedictionary.com © 1981-2005.

Grattan, Nick. "Windows CE 3.0 Application Programming" © 2001 Prentice-Hall Inc. Excerpts from Chapters 1-3, 8, 11, & 15.

Office Action Summary from U.S. Appl. No. 10/122,087 which was mailed on Mar. 30, 2006.

Office Action Summary from U.S. Appl. No. 10/122,087 which was mailed on Dec. 9, 2005.

Examiner's Answer from U.S. Appl. No. 10/122,095 which was mailed on Oct. 27, 2006.

Examiner's Answer from U.S. Appl. No. 10/122,095 which was mailed on Aug. 24, 2006.

Office Action Summary from U.S. Appl. No. 10/122,095 which was mailed on Feb. 2, 2006.

Office Action Summary from U.S. Appl. No. 10/122,095 which was mailed on Sep. 23, 2005.

Office Action Summary from U.S. Appl. No. 10/121,087 which was mailed on Oct. 3, 2005.

Office Action Summary from U.S. Appl. No. 10/122,087 which was mailed on Sep. 7, 2006.

Advisory Action from U.S. Appl. No. 10/122,087 which was mailed on Jun. 20, 2006.

Office Action Summary from U.S. Appl. No. 10/122,087 which was mailed on Aug. 24, 2007.

* cited by examiner

GENERATING MALWARE DEFINITION DATA FOR MOBILE COMPUTING DEVICES

BACKGROUND OF THE INVENTION

1. Field of the Invention

This invention relates to the field of data processing systems. More particularly, this invention relates to the generation of malware definition data for mobile computing devices, for example data defining computer viruses, worms, Trojans, banned files, banned words, banned images etc. for devices such as personal digital assistants, smartphones, personal data storage devices etc.

2. Description of the Prior Art

It is known that malware, such as computer viruses, worms, Trojans, banned files, banned words, banned images etc, provides a significant threat to data processing systems. In order to address this threat, malware scanners are provided that perform on-access or on-demand examination of computer files to determine if they are infected with malware. In order to be fully effective, it is important that the malware definition data in use should be kept as up-to-date as possible. The greatest malware threat is often posed by the most newly released malware items and up-to-date malware definition data is needed in order to detect such newly released malware items. Within the context of fixed location computing devices, such as user PCs within business networks, it is established practice and there are provided known tools (such as e-Policy Organiser produced by Network Associates, Inc) that may be used to ensure that each computer has access to the most up-to-date malware definition data quickly.

There is an increasing and accelerating use of mobile computing devices using a variety of different computing platforms. Examples of such devices are personal digital assistants (PDAs providing diary, e-mail, note taking and other functions), smartphones, personal data storage devices, and the like. The range of uses and forms of such devices is rapidly increasing and the above list is far from exhaustive.

With the increased use of mobile computing devices, it is starting to occur that malware is being released that targets such devices. A further problem is that a mobile computing device may serve to store a malware infected file that does not impact that device itself, but does cause a problem when transferred to another device. A mobile computer device can thus act as an "typhoid Mary" in spreading malware infection.

One approach to malware scanning mobile computing devices is to download the computer files they store to a PC, and then use the malware scanner on the PC to scan those files. Whilst this works, it is slow. This slowness is made worse by the rapidly increasing data storage capacities of mobile computing devices which results in the need to transfer larger volumes of data to and from those devices for scanning.

As mentioned previously, it is also important that malware definition data should be up-to-date in order to protect against newly released malware items. Malware scanner providers expend considerable effort in rapidly providing updates to their malware definition data when a new threat occurs. A newly released computer virus, such as a mass mailing macro virus, can spread rapidly and it is important to the customers of such malware scanner providers that malware definition data which will identify such items of malware is available in a matter of hours from the release of the new malware item. Providing different sets of malware definition data targeted at different mobile computing platforms represents an additional and disadvantageous maintenance overhead and slows down the availability of updated malware definition data.

Measures which can provide malware protection for mobile computing devices and easy updating of malware definition data are strongly advantageous.

SUMMARY OF THE INVENTION

Viewed from one aspect the present invention provides a computer program product for controlling a computer to generate mobile computing device malware definition data for use by a mobile computing device malware scanner executable upon a mobile computing device, said computer program product comprising:

obtaining code operable to obtain from a data source master malware definition data, said master malware definition identifying a plurality of items of malware each belonging to one of a plurality of classes of malware threat;

identifying code operable to identify one or more classes of malware threat against which said mobile computing device is to be protected; and generating code operable to generate from said master malware definition data said mobile computing device malware definition data, said mobile computing device malware definition data identifying items of malware identified within said master malware definition data which are within classes of malware threat against which said mobile computing device is to be protected.

The invention recognises that items of malware included within malware definition data relate to relatively distinct malware classes. As examples, some malware classes are scripts, macros, EXE files, boot viruses etc. It is known within existing malware definition data to include information that classifies the malware items in this way. This classification of malware items can be used to automate the generation of device specific malware definition data for mobile computing devices. More particularly, certain mobile computing devices will be subject to certain classes of malware threat but not others, and accordingly the malware class information can be used to select the malware items from within the master set of malware definition data that should be included within a mobile computing device of specific set of malware definition data. This enables the automation of the generation of the device specific malware definition data.

Preferred embodiments of the invention utilise a fixed location computing device to perform the steps of obtaining, identifying and generating. A fixed location computing device typically has available to it permanent or quasi permanent network connections, which may be used to access an updated master malware definition data set, and sufficient processing and storage capacity to generate and store one or more mobile computing device specific malware definition data sets. The fixed location computing device can be considered to become a "parent" or "guardian" of the mobile computing devices which connect to it and to which it can transfer their updated malware definition data.

The fixed location computing device may be one that is physically remote from the mobile computing device, but can communicate with it, e.g. a security policy organising server on a network, or preferably is a fixed location computing device that has a physical connection to the mobile computing device, e.g. a user's client computer possibly with an interface cradle for mobile computing device or the like (such as wireless connections, e.g. 802.11/Bluetooth etc.).

The regular updating of malware definition data for mobile computing devices is made more likely to be performed if it is integrated with other actions normally performed by the device user rather than requiring a specific action of its own.

For this reason, preferred embodiments of the invention act to check and, if necessary, update mobile computing device malware definition data during file synchronisation operations between the fixed location computing device and the mobile computing device.

The task of the fixed location computing device to generate the device specific malware definition data for mobile computing devices is made easier by the use of profile data identifying one or more different types of mobile computing device and threat data identifying one or more classes of malware threat to which different types of mobile computing device are vulnerable. In this way, the appropriate malware definition data can be readily selected from the master malware definition data.

The task of generating the mobile computing device malware definition data is further simplified by the realisation that this data is largely dependent upon the operating system of the mobile computing device, as malware tends to be operating system specific rather than hardware device specific.

Preferred embodiments operate to detect which mobile computing devices may be connected to them, in order to prepare the appropriate device specific malware definition data, by detecting the installation of application programs intended to communicate with such mobile computing devices. As an example, the installation on a PC of a computer program known to have the function of communicating with WinCE devices may be detected and thereafter the PC malware scanning agent may act to generate WinCE malware definition data from the master set of PC malware definition data it uses itself.

The mechanisms used to detect which mobile device specific malware definition data should be generated and transferred to the mobile computing devices may advantageously be utilised to also transfer and update malware scanning programs to the mobile computing devices for execution as native of applications by the mobile computing devices themselves. Thus, the scanner engines can be kept up-to-date by using the fixed location computer to keep the latest scanner programs available for immediate transfer to the mobile computing device as and when it is connected to that fixed location computing device.

As previously mentioned, the malware against which the mobile computing device and the fixed computing device may be protected can take a wide variety of different forms. These depend largely upon the threats posed to the particular devices concerned and include computer viruses, worms, Trojans, banned files, banned words, banned images and the like.

Viewed from further aspects the present invention also provides a method for generating mobile computing device malware definition data and an apparatus for generating mobile computing device malware definition data.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
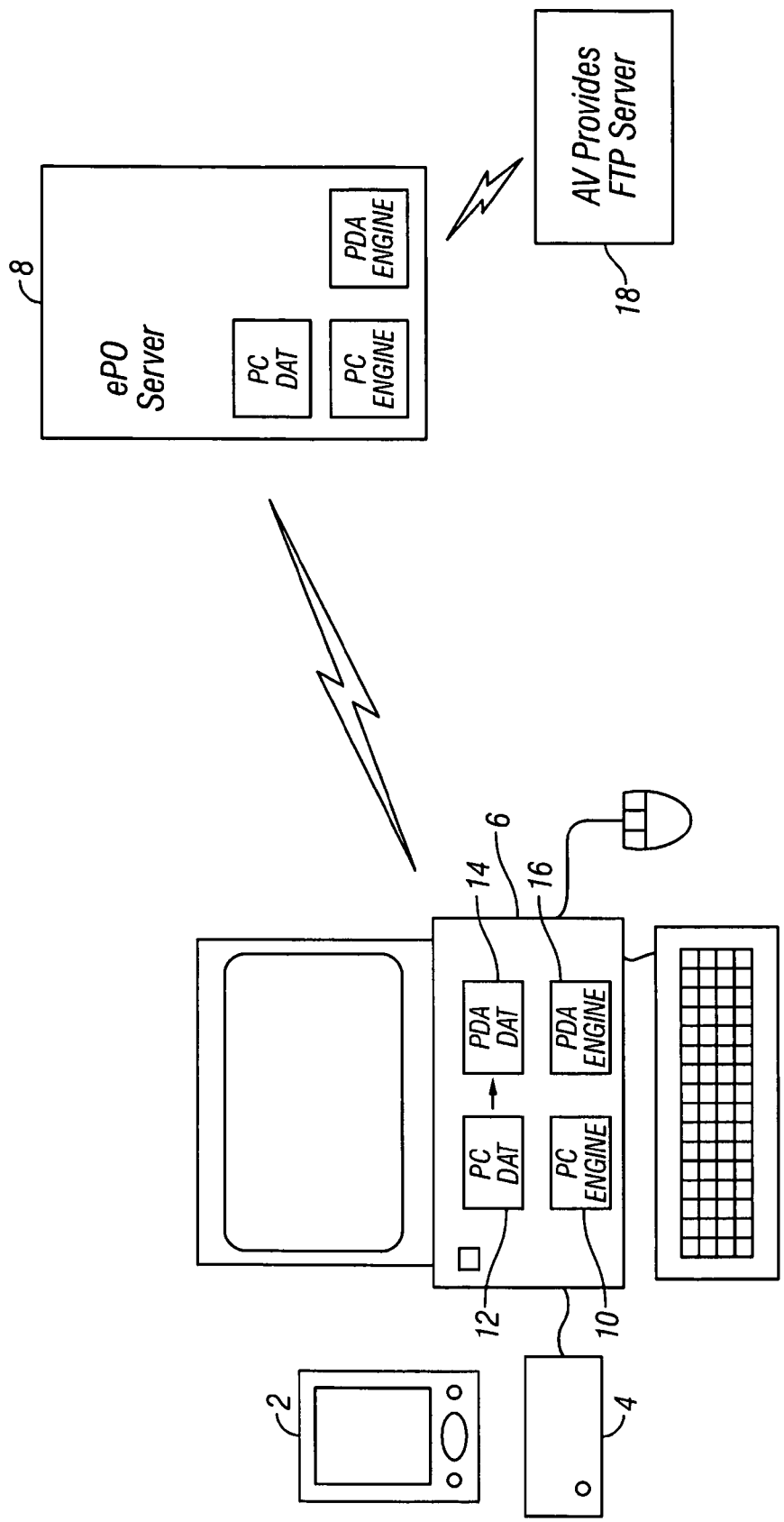
FIG. 1 schematically illustrates the relationship between a mobile computing device and a plurality of fixed location computer devices with which it may be directly or indirectly connected.

FIG. 1 illustrates a personal digital assistant (PDA) 2 that may be linked via a cradle 4 with a personal computer 6. The PDA 2 is one example of a mobile computing device with which the present invention may be used. Other examples would be a smartphone or a personal data storage device. It will be readily understood that many other different types of mobile computing device may also require malware protection and may utilise the present technique. The cradle 4 provides a physical connection with the PC 6. It will be appreciated that other types of connection, such as a wireless (e.g. Bluetooth) connection or an IR optical connection may also be used.

The PC 2 is a fixed location computing device that operates within a well defined and controlled computer network. The PC 6 has a network link with a security policy organising server 8, such as a server running e-Policy Organiser provided by Network Associates, Inc. The PC 6 has a loaded and active malware scanner that uses a PC scanning engine 10 and PC malware definition data 12. The widespread use of PCs is such that malware scanner providers typically concentrate a high level of resources on keeping PC malware definition data 12 up-to-date and comprehensive. Accordingly, this PC malware definition data 12 may be regarded as the master malware definition data from which malware definition data for various mobile computing devices may be derived.

The PC 6 has installed upon it application software that interfaces with the cradle 4 and the PDA 2. The installation of this application software is detected by the security policy organising server 8 and used to configure the appropriate agent on the PC 6 to maintain at the PC 6 a PDA specific malware definition data set 14 as well as an up-to-date copy of the PDA scanner engine 16. In this example, the PDA malware definition data 14 is derived from the PC malware definition data 12 within the PC itself. Alternatively, this derivation could take place within the security policy organising server 8 with the PC 6 merely serving to download the appropriate PDA malware definition data. The PDA scanner engine 16 is updated by the scanner provider and the most up-to-date copy stored within the security policy organising server 8.

As illustrated, the security policy organising server 8 communicates with a scanner provider's FTP server 18 which it regularly polls for updated master malware definition data (PC malware definition data) and any updated scanner engine programs. When these become available, they are downloaded from the FTP server 18 to the security policy organising server 8 to be made available to the various PC agents executing on the PCs connected to that security policy organising server 8.

Figure 2:
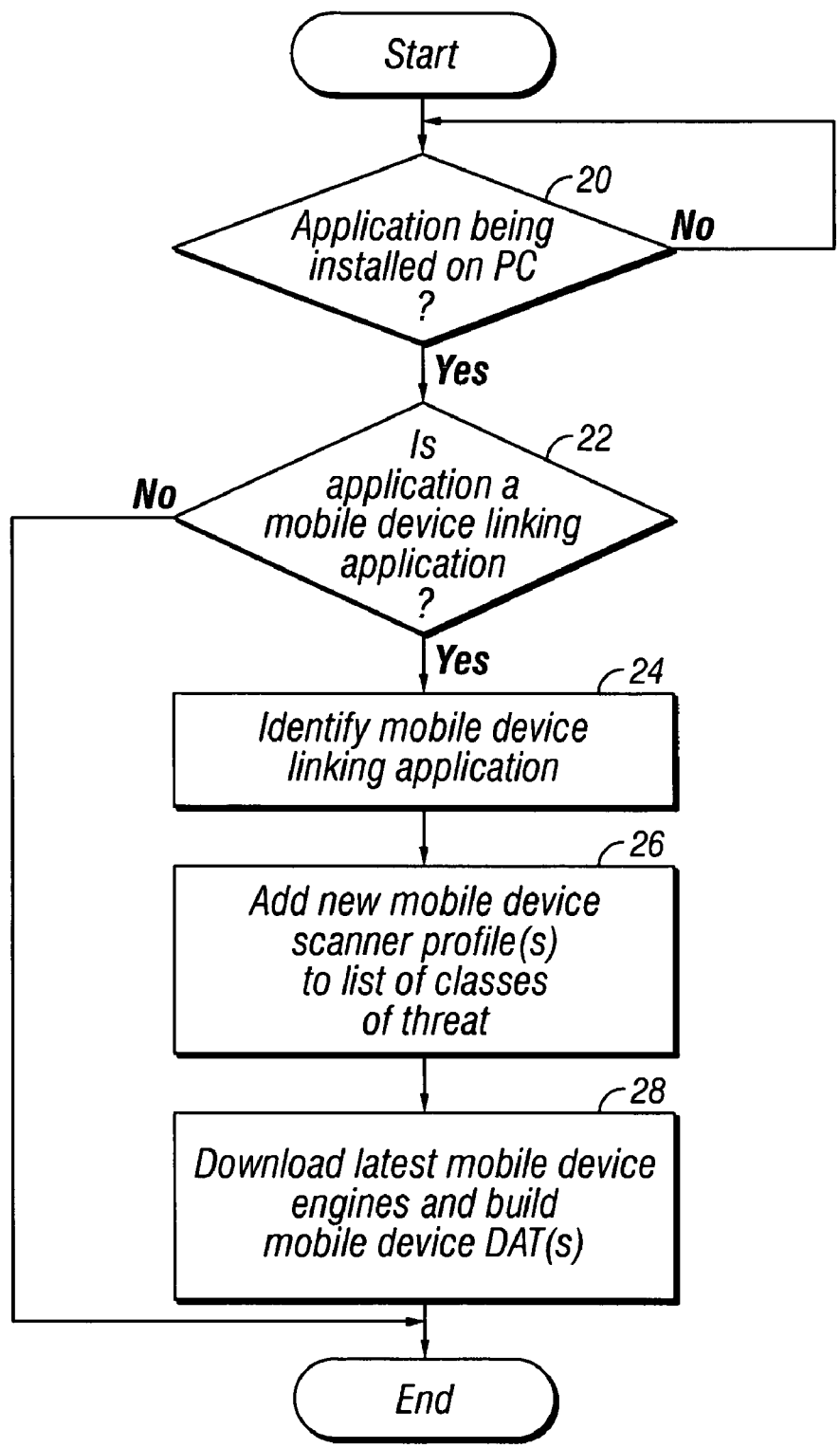
FIG. 2 is a flow diagram illustrating a PC detecting installation of an application program for communication with a mobile computing device.

FIG. 2 is a flow diagram illustrating installation of an application program on the PC 6. At step 20, a check is made as to whether or not an application is being installed. When an application is being installed, then processing proceeds to step 22 at which a determination is made as to whether or not the application being installed is a known application which serves to provide a link to a mobile computing device. There are a relatively small number of application programs that are provided for communication between PCs and mobile computing devices and accordingly the maintenance of a list of such applications and the detection of the installation of such applications is relatively straight forward. If the application being installed is not one that links to a mobile computing device, then the processing terminates. If the application being installed is one which links to a mobile computing device, then step 24 seeks to identify the particular mobile computing device linking application concerned. These linking application programs tend to be generic to an operating system for mobile computing devices. As an example, the installation of the PsiWin program indicates that the device that will be connected will be run using the EPOC mobile computing device operating system. Similar programs that execute upon the PC may target WinCE and Palm operating system devices. It is also possible that a particular application program may be highly device specific in some circumstances or support multiple mobile computing device operating systems.

After the mobile device linking application has been identified at step 24, step 26 serves to generate profile data associated with the type of mobile computing device that may be expected to be connected to the PC concerned in due course. This profile data includes data identifying the different classes of malware threat to which the mobile computing device or devices concerned are vulnerable and against which the malware definition data to be produced for those mobile computing devices should protect.

At step 28, the PC serves to download the latest version of the scanner engines appropriate for the mobile computing devices which are anticipated as being in future connected to that PC and also to build one or more mobile device definition data sets (DATs). Thus, in this example, the installation of software for communicating with a mobile computing device on a PC triggers that PC to build an appropriate collection of mobile computing device malware definition data and make available scanner engine programs on the PC such that these may be provided to the mobile computing device when it is connected to the PC. It may be that the PC will force installation of the malware scanner program on the mobile computing device if one is not already installed, or alternatively merely update such a malware scanner if it is already present as soon as it connects to that PC.

Figure 3:
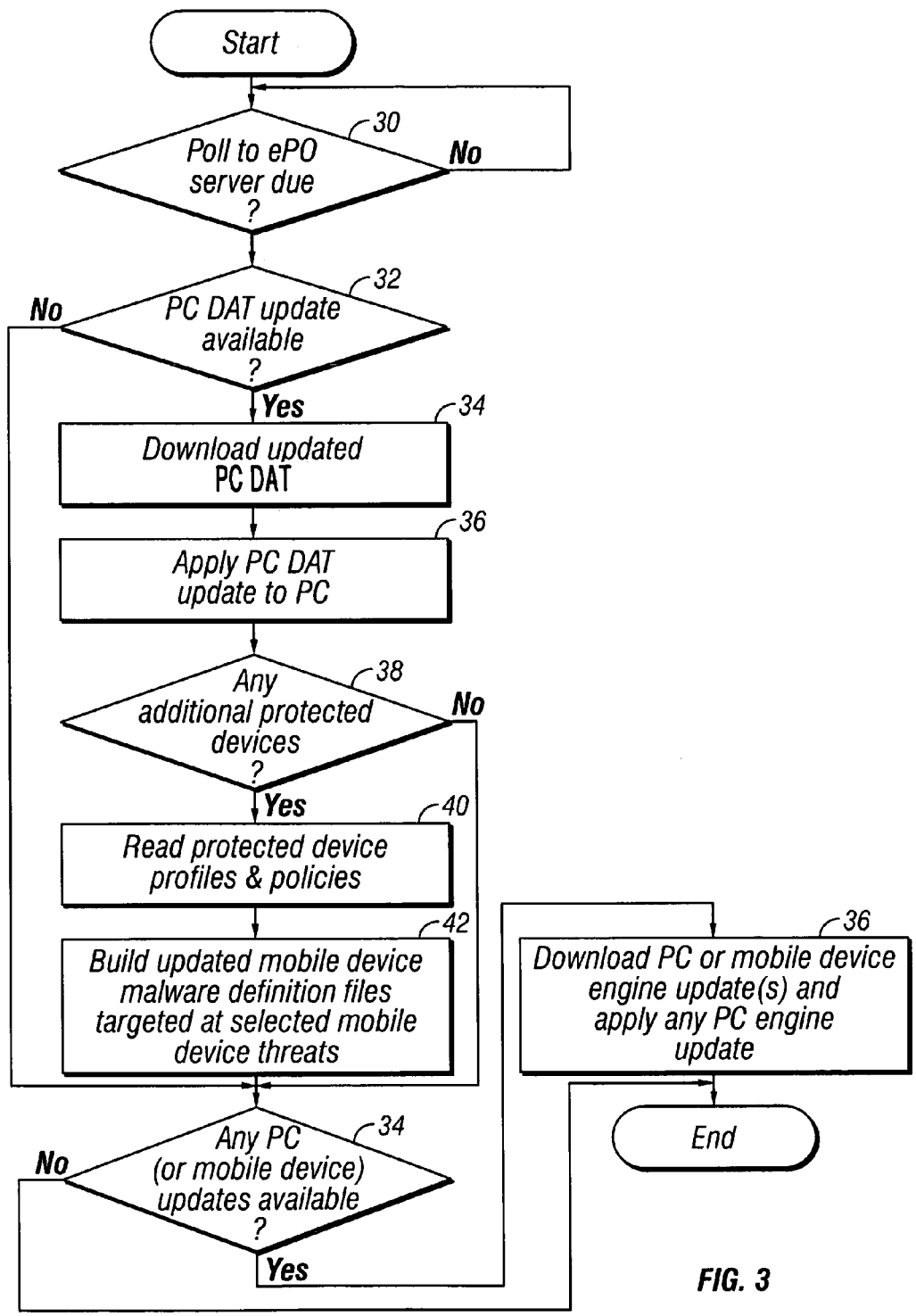
FIG. 3 is a flow diagram illustrating the updating of malware definition data upon a fixed location computer and the downloading of updated scanner programs.

FIG. 3 schematically illustrates the processing performed by the PC 6 in keeping its malware protection up to date. At step 30, the PC 6 periodically polls the security policy organising server 8. When such a poll is made, step 32 determines whether or not an updated PC malware definition data set is available. If such updated malware definition data for the PC is not available, then processing proceeds to step 34 at which a check is made for any available updated scanner engines for the PC or any mobile device that may be connected to that PC. Step 36 downloads any such new scanner engine programs and applies the PC versions if included. The mobile device versions will be held by the PC for transfer to the mobile device when it connects and installation on the mobile device at that time.

If step 32 indicated that a PC malware definition data said update was available, then step 34 downloads this update to the PC and step 36 applies it to the PC. Step 38 then determines whether or not there are any mobile computing devices for which the PC is responsible for maintaining mobile computing device malware definition data. If there are no such mobile computing devices for which the PC is responsible (e.g. there are no application programs installed on the PC for communicating with such devices), then processing proceeds to step 34.

If the test at step 38 indicates that the PC is responsible for generating and maintaining up to date mobile computing device malware definition data, then processing proceeds to step 40 at which the appropriate profile data and policy data is read for the mobile computing devices concerned. The profile data will include classes of malware threat to which particular mobile computing devices are vulnerable. The policy data may include user defined settings as to how the profile data should be interpreted. In a high security environment, or with mobile computer devices known to provide a significant risk, then the policy settings may be such as to increase the number of classes of malware threat against which the mobile computing device malware definition data will be generated to protect. As an example, it may be that a particular type of mobile computing device is known to be used to transfer computer files that are intended to be executed on a PC and accordingly it is appropriate to scan for all the malware threats to which a PC may be subject even though many of these will not apply to the mobile computing device itself.

Once the profile data and associated policies have been read by step 40, they are used by step 42 to control the building of updated mobile computing device malware definition data files targeted at the selected mobile computing device threats. Thus, the PC malware definition data serves as master malware definition data including information identifying the different classes of malware threat to which particular malware items belong allowing step 42 to select the data defining the items of malware within the classes of malware threat known to pose a problem to the particular mobile computing devices concerned, or against which it is desired to protect more generally in a line with user defined policies.

Figure 4:
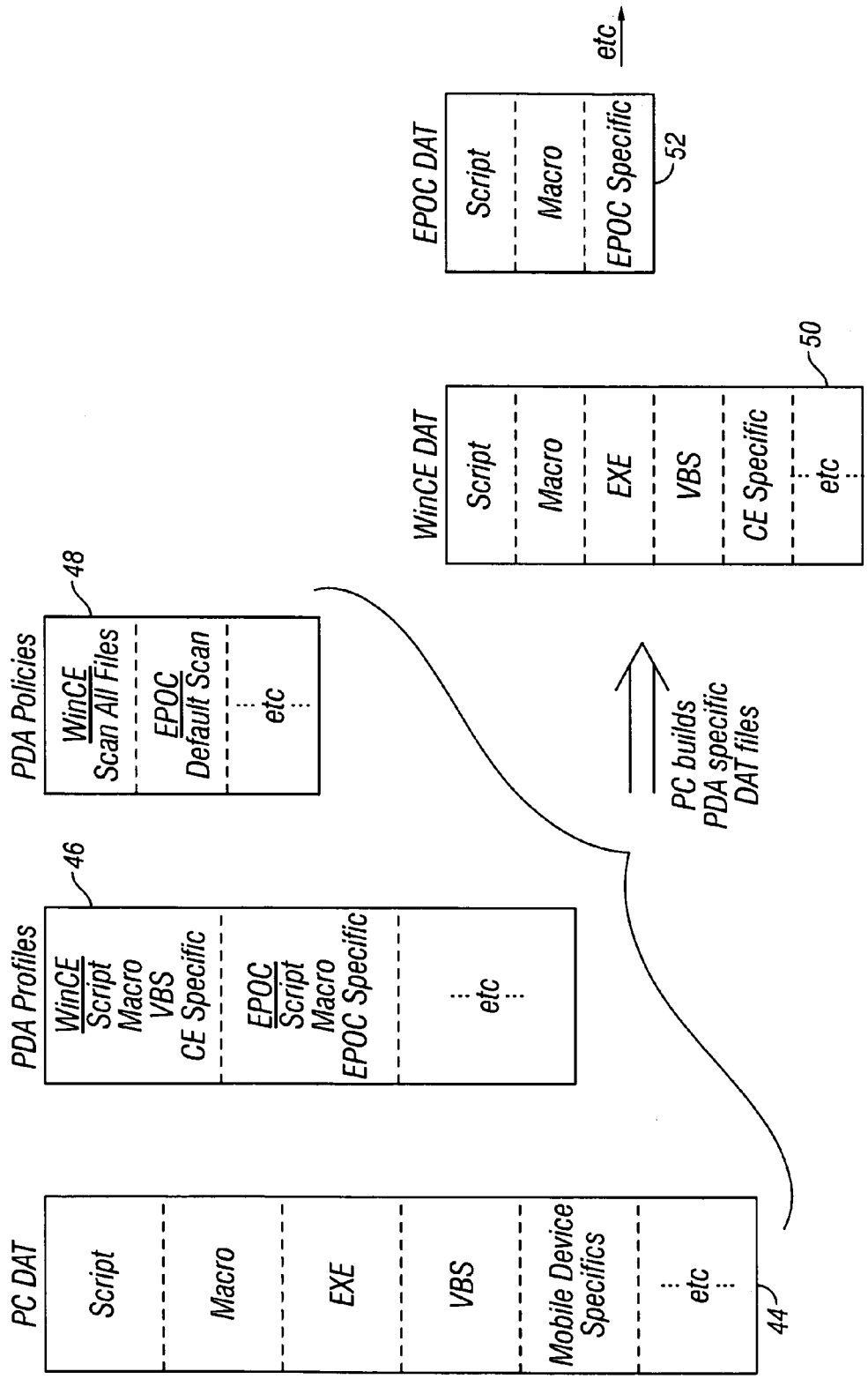
FIG. 4 is a diagram schematically illustrating the use of master malware definition data, mobile computing device profiles and policy data to generate mobile computing device malware definition data of various forms.

FIG. 4 schematically illustrates the generation of mobile computing device malware definition data from master malware definition data. In this case, the master malware definition data is the PC malware definition data 44. The PC 6 also stores profile data 46 which identifies for each operating system platform for mobile computing devices which may be connected to that PC against which classes of malware item within the master malware definition data the particular operating system should be protected. Policy data 48 includes user defined policy settings that modify the profile data. In the example illustrated for EPOC operating system devices, the malware definition data will be built to protect against the default set of classes of threat as indicated in the profile data 46. Conversely, a higher security setting is defined within the policy data 48 for WinCE devices where it is indicated that all file types should be scanned and accordingly malware definition data built for WinCE devices will include data defining malware items that will not in themselves adversely affect a WinCE device, but which could harm a device to which an infected file is passed by such a WinCE device.

There are a small subset of malware items that only adversely impact mobile computing devices and do not operate upon PCs. An example would be a computer virus specific to the Palm operating system. The master malware definition data 44 includes data defining such mobile device specific malware threats even though they would not impact a PC itself. These may be usefully provided within the data which controls how a PC scans as they are relatively few in number and the presence of such a malware item on the PC might threaten the data on an associated mobile computing device should that file be transferred to the mobile computing device concerned. The mobile computing device malware definition data sets 50, 52 that are built by the PC will include the mobile device specific malware items for the operating system platform of the device concerned. The mobile device specific malware items for other mobile computing device operating systems would not normally be included.

Figure 5:
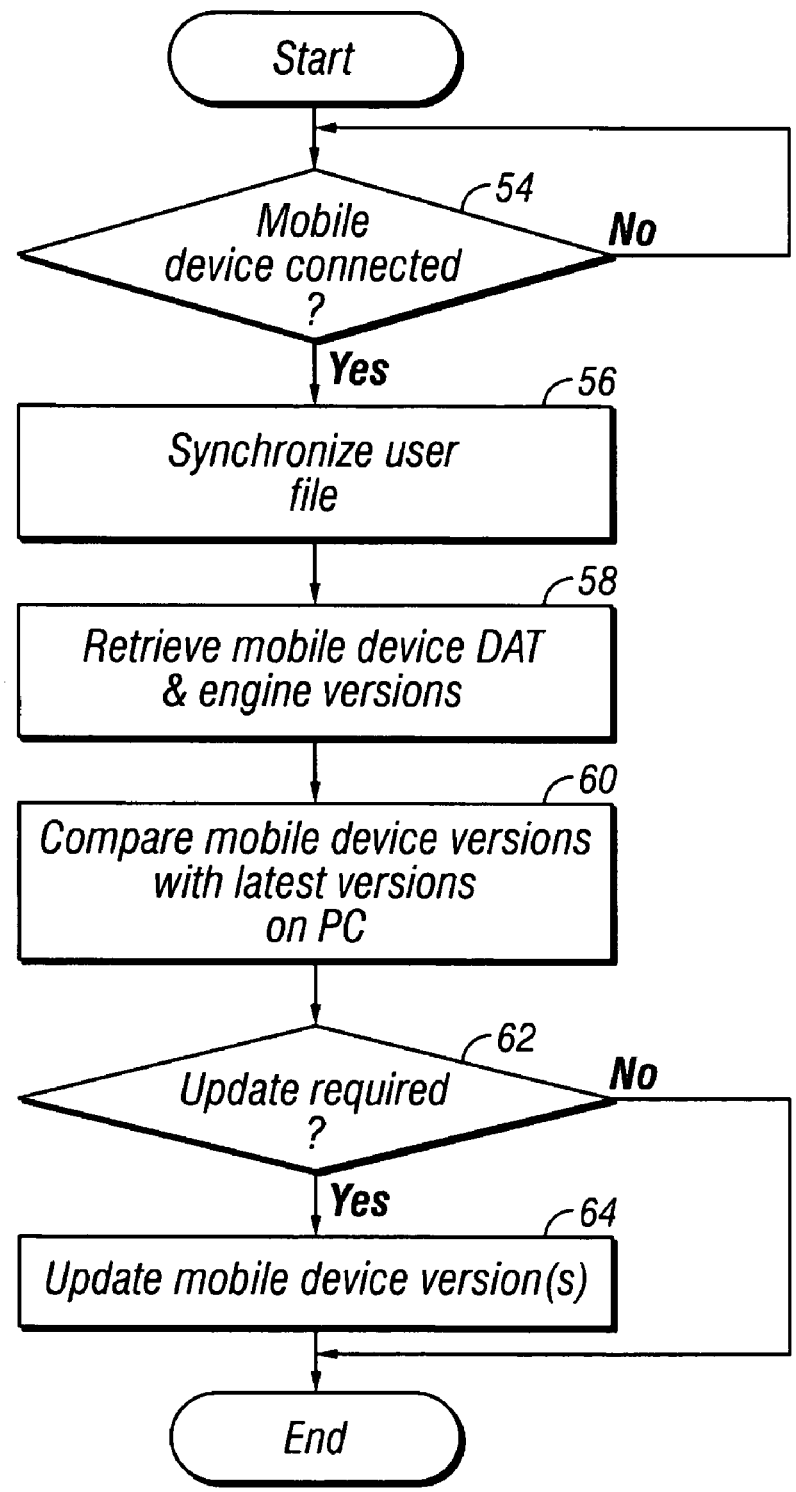
FIG. 5 is a flow diagram illustrating updating of malware definition data for a mobile computing device upon connection of that mobile computing device to a fixed location computer.

FIG. 5 schematically illustrates the updating of a malware definition data set on a mobile computing device. At step 54, the PC 6 waits for a mobile computing device to be connected. Once such a device is detected, step 56 performs the automatic synchronisation tasks typically set up on a PC for such devices. It may be that such synchronisation does not automatically occur, or only occurs when user triggered, but once triggered follows a predetermined form. An alternative to the synchronisation performed at step 56, or in addition to its synchronisation, would be automatic backup of a mobile computing device that is performed when it is connected to its parent PC.

At step 58, data identifying the versions of the malware definition data and malware scanner program currently installed on the mobile computing device are retrieved from the mobile computing device to the PC. At step 60, these retrieved version identifiers are compared with the identifiers for the latest versions of the mobile computing device malware definition data and mobile computing device scanner program held on the PC and kept updated in accordance with FIG. 3. If an update is required, then this is detected at step 62 and step 64 then transfers the appropriate updated mobile computing device malware definition data or mobile computer device scanner program to the mobile computing device and installs it thereupon.

It will be appreciated that the PC effectively performs the role of a parent or guardian for those mobile computing devices that may be connected to it. The PC takes responsibility for making available updated malware definition data and malware scanner programs for the mobile computing device that can connected to it. The appropriate mobile computer device malware definition data may be locally built by the PC from its own malware definition data. In this way, the mobile computing device may benefit from the permanent or quasi-permanent high bandwidth communication links that are available to the PC and the methodical and secure malware protection policies, systems and practices that are provided for the PC operating within its controlled environment. Thus, the PC will typically have reliable malware definition data updates and scanner program updates which are monitored and enforced either manually by a System Administrator or automatically by a security policy organising server 8.

Figure 6:
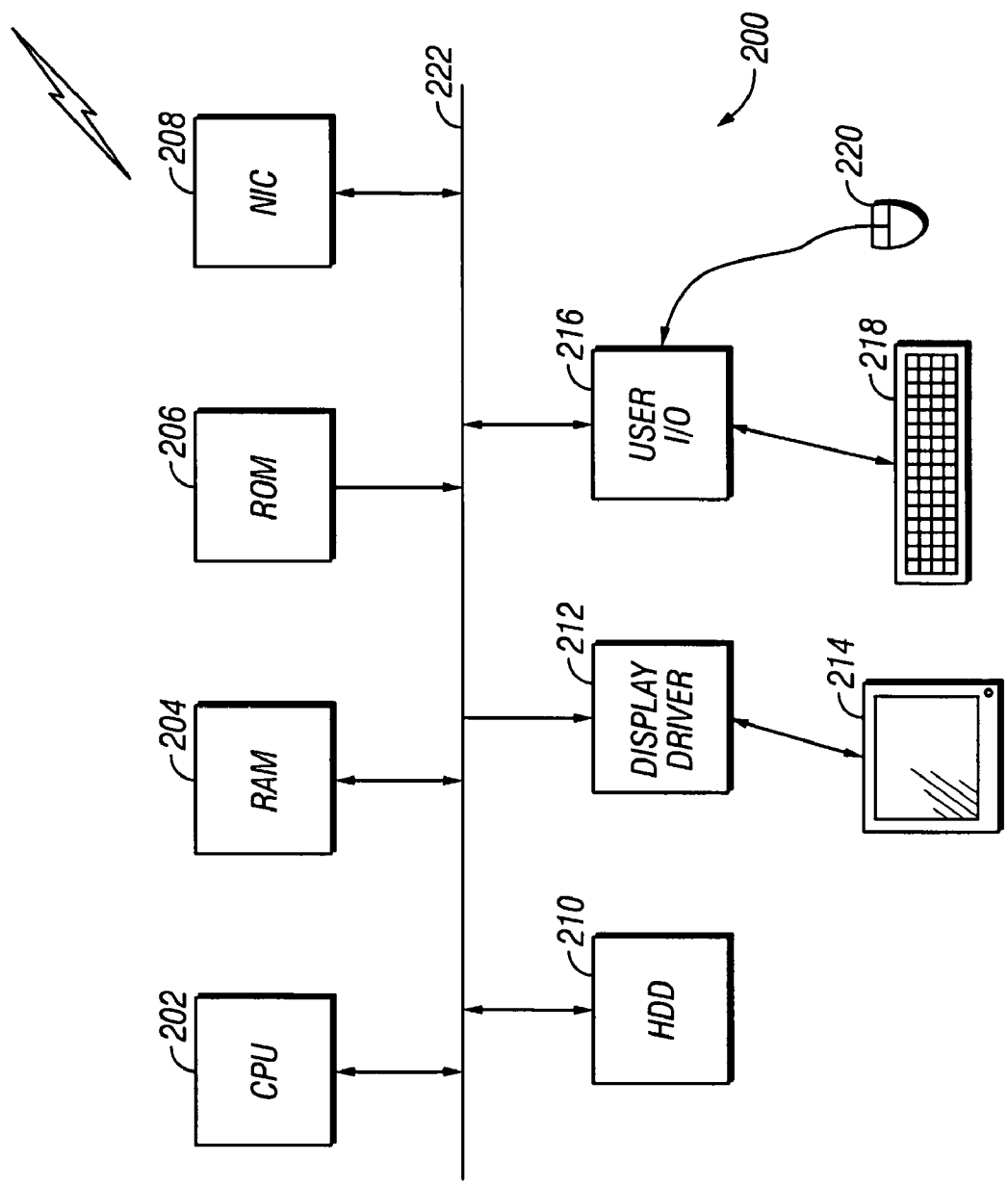
FIG. 6 is a diagram schematically illustrating the architecture of a general purpose computer that may be used to implement the above described techniques.

FIG. 6 schematically illustrates a general purpose computer 200 of the type that may be used to implement the above described techniques. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 6 is only one example.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A computer program product embodied on a tangible computer readable medium for controlling a computer to generate mobile computing device malware definition data for use by a mobile computing device malware scanner executable upon a mobile computing device, said computer program product comprising:

obtaining code operable to obtain from a data source master malware definition data, said master malware definition identifying a plurality of items of malware each belonging to one of a plurality of classes of malware threat;

identifying code operable to identify one or more classes of malware threat against which said mobile computing device is to be protected; and generating code operable to generate from said master malware definition data said mobile computing device malware definition data, said mobile computing device malware definition data identifying items of malware identified within said master malware definition data which are within classes of malware threat against which said mobile computing device is to be protected;

wherein said obtaining code, said identifying code and said generating code are executed by a fixed location computing device, said fixed location computer being operable to transfer to said mobile computing device one or more computer files including at least, a computer file containing said mobile computer device malware definition data;

wherein said fixed location computing device stores profile data identifying one or more different types of mobile computing device to which said fixed location computing device transfers computer files and corresponding threat data identifying one or more classes of malware threat to which each of said mobile computing devices is vulnerable;

wherein only a subset of said master malware definition data is used to generate said mobile computing device malware definition data for tailoring said mobile computing device malware definition data to accommodate malware threats to which said mobile computing device is vulnerable; wherein said one or more classes of malware threat against which said mobile computing device is to be protected are chosen according to classes of malware threat known to pose a problem to said mobile computing device, and classes for which it is desired to protect said mobile computing device according to user defined policies;

wherein fixed location computing device also transfers a malware scanner computer program from said data source to said mobile computing device; and wherein said fixed location computing device checks for an undated malware scanner computer program becoming available from said data source and, if such an undated malware scanner computer program become available, then obtains said undated malware scanner computer program for transfer to said mobile computing device.

2. A computer program product as claimed in claim 1, wherein said fixed location computing device is a user computer having communication link with said mobile computing device.

3. A computer program product as claimed in claim 1, wherein, when said mobile computing device is connected to said fixed location computing device, different versions of user generated computer files respectively stored by said mobile computing device and said fixed location computing device are synchronized.

4. A computer program product as claimed in claim 3, wherein said mobile computing device malware definition data is transferred from said fixed location computing device to said mobile computing device during said synchronization.

5. A computer program product as claimed in claim 3, when said mobile computing device is connected to said fixed location computing device, versions of said mobile computing device malware definition data stored on said mobile computing device and said fixed location computing device are compared, and, if said fixed location computing device has a more up-to-date version of said mobile computing device malware definition data, then said more up-to-date version of said mobile computing device malware definition data is transferred from said fixed location computing device to said mobile computing device.

6. A computer program product as claimed in claim 1, wherein user controlled policy data is used in combination with said threat data to control against which classes of malware threat said mobile computing device is protected by said mobile computing device malware definition data.

7. A computer program product as claimed, in claim 1, wherein said different types of mobile computing device correspond to different types of operating system computer programs used by mobile computing devices.

8. A computer program product as claimed in claim 1, wherein said fixed location computer device detects to which mobile computing devices it transfers computer files by detecting installation upon said fixed location computing device of one or more transfer controlling computer programs operable to control transfer of computer flies to one or more predetermined mobile computing devices.

9. A computer program product as claimed in claim 1, wherein said fixed location computing device checks for updated master malware definition data becoming available from said data source and, if such updated master malware definition data becomes available, then repeats said steps of obtaining, identifying and generating.

10. A computer program product as claimed in claim 1, wherein said master malware definition data is also used to protect said fixed location computing device from malware.

11. A computer program product as claimed in claim 1, wherein said fixed location computing device is connected to said data source by a fixed internet link.

12. A computer program product as claimed in claim 1, wherein said items of malware include one or more of a computer virus, a worm, a Trojan, a banned computer file, a banned word and a banned image.

13. A method of generating mobile computing device malware definition data for use by a mobile computing device malware scanner executable upon a mobile computing device, said method comprising the steps of:
    obtaining from a data source master malware definition data, said master malware definition identifying a plurality of items of malware each belonging to one of a plurality of classes of malware threat;
    identifying one or more classes of malware threat against which said mobile computing device is to be protected; and
    generating from said master malware definition data said mobile computing device malware definition data, said mobile computing device malware definition data identifying items of malware identified within said master malware definition data which are within classes of malware threat against which said mobile computing device is to be protected;
    wherein said steps of obtaining, identifying and generating are performed by a fixed location computing device, said fixed location computer being operable to transfer to said mobile computing device one or more computer files including at least a computer file containing said mobile computer device malware definition data;
    wherein said fixed location computing device stores profile data identifying one or more different types of mobile computing device to which said fixed location computing device transfers computer files and corresponding threat data identifying one or more classes of malware threat to which each of said mobile computing devices is vulnerable;
    wherein only a subset of said master malware definition data is used to generate said mobile computing device malware definition data for tailoring said mobile computing device malware definition data to accommodate malware threats to which said mobile computing device is vulnerable;
    wherein fixed location computing device also transfers a malware scanner computer program from said data source to said mobile computing device; and wherein said fixed location computing device checks for an undated malware scanner computer program becoming available from said data source and, if such an updated malware scanner computer program become available, then obtains said updated malware scanner computer program for transfer to said mobile computing device.

14. A method as claimed in claim 13, wherein said fixed location computing device is a user computer having communication link with said mobile computing device.

15. A method as claimed in claim 13, wherein, when said mobile computing device is connected to said fixed location computing device, different versions of user generated computer files respectively stored by said mobile computing device and said fixed location computing device are synchronized.

16. A method as claimed in claim 15, wherein said mobile computing device malware definition data is transferred from said fixed location computing device to said mobile computing device during said synchronization.

17. A method as claimed in claim 15, when said mobile computing device is connected to said fixed location computing device, versions of said mobile computing device malware definition data stored on said mobile computing device and said fixed location computing device are compared, and, if said fixed location computing device has a more up-to-date version of said mobile computing device malware definition data, then said more up-to-date version of said mobile computing device malware definition data is transferred from said fixed location computing device to said mobile computing device.

18. A method as claimed in claim 13, wherein user controlled policy data is used in combination, with said threat data to control against which classes of malware threat said mobile computing device is protected by said mobile computing device malware definition data.

19. A method as claimed in claim 13, wherein said different types of mobile computing device correspond to different types of operating system computer programs used by mobile computing devices.

20. A method as claimed in claim 13, wherein said fixed location computer device detects to which mobile computing devices it transfers computer files by detecting installation upon said fixed location computing device of one or more transfer controlling computer programs operable to control transfer of computer files to one or more predetermined mobile computing devices.

21. A method as claimed in claim 13, wherein said fixed location computing device checks for updated master malware definition data becoming available from said data source and, if such updated master malware definition data becomes available, then repeats said steps of obtaining, identifying, and generating.

22. A method as claimed in claim 13, wherein said master malware definition data is also used to protect said fixed location computing device from malware.

23. A method as claimed in claim 13, wherein said fixed location computing device is connected to said data source by a fixed internet link.

24. A method as claimed in claim 13, wherein said items of malware include one or more of a computer virus, a worm, a Trojan, a banned computer file, a banned word and a banned image.

25. Apparatus for generating mobile computing device malware definition data for use by a mobile computing device malware scanner executable upon a mobile computing device, said apparatus comprising:
    obtaining logic operable to obtain from a data source master malware definition data, said master malware definition identifying a plurality of items of malware each belonging to one of a plurality of classes of malware threat;
    identifying logic operable to identify one or more classes of malware threat against which said mobile computing device is to be protected; and
    generating logic operable to generate from said master malware definition data said mobile computing device malware definition data, said mobile computing device malware definition data identifying items of malware identified within said master malware definition data which are within classes of malware threat against which said mobile computing device is to be protected;
    wherein said obtaining logic, said identifying logic and said generating logic are provided by a fixed location computing device, said fixed location computer being operable to transfer to said mobile computing device one or more computer files including at least a computer file containing said mobile computer device malware definition data;
    wherein said fixed location computing device stores profile data identifying one or more different types of mobile computing device to which said fixed location computing device transfers computer files and corresponding threat data identifying one or more classes of malware threat to which each of said mobile computing devices is vulnerable;
    wherein only a subset of said master malware definition data is used to generate said mobile computing device malware definition data for tailoring said mobile computing device malware definition data to accommodate malware threats to which said mobile computing device is vulnerable; wherein fixed location computing device also transfers a malware scanner computer program from said data source to said mobile computing device; and wherein said fixed location computing device checks for an undated malware scanner computer program becoming available from said data source and, if such an undated malware scanner computer program become available, then obtains said undated malware scanner computer program for transfer to said mobile computing device.

26. An apparatus as claimed in claim 25, wherein said fixed location computing device is a user computer having communication link with said mobile computing device.

27. An apparatus as claimed in claim 25, wherein, when said mobile computing device is connected to said fixed location computing device, different versions of user generated computer files respectively stored by said mobile computing device and said fixed location computing device are synchronized.

28. An apparatus as claimed in claim 27, wherein said mobile computing device malware definition data is transferred from said fixed location computing device to said mobile computing device during said synchronization.

29. An apparatus as claimed in claim 27, when said mobile computing device is connected to said fixed location computing device, versions of said mobile computing device malware definition data stored on said mobile computing device and said fixed location computing device are compared, and, if said fixed location computing device has a more up-to-date version of said mobile computing device malware definition data, then said more up-to-date version of said mobile computing device malware definition data is transferred from said fixed location computing device to said mobile computing device.

30. An apparatus as claimed in claim 25, wherein user controlled policy data is used in combination with said threat data to control against which classes of malware threat said mobile computing device is protected by said mobile computing device malware definition data.

31. An apparatus as claimed in claim 25, wherein said different types of mobile computing device correspond to different types of operating system computer programs used by mobile computing devices.

32. An apparatus as claimed in claim 25, wherein said fixed location computer device detects to which mobile computing devices it transfers computer files by detecting installation upon said fixed location computing device of one or more transfer controlling computer programs operable to control transfer of computer files to one or more predetermined mobile computing devices.

33. An apparatus as claimed in claim 25, wherein said fixed location computing device checks for updated master malware definition data becoming available from said data source and, if such updated master malware definition data becomes available, then repeats said steps of obtaining, identifying and generating.

34. An apparatus as claimed in claim 25, wherein said master malware definition data is also used to protect said fixed location computing device from malware.

35. The computer program product as claimed in claim 1, wherein said fixed location device stores policy data including user defined settings identifying the manner in which said profile data is to be interpreted.

36. A computer program product as claimed in claim 1, wherein said one or more classes of malware threat against which said mobile computing device is to be protected are chosen according to said classes of malware threat known to pose a problem to an operating system of said mobile computing device.

37. A computer program product as claimed in claim 1, wherein at least a portion of said mobile computing device malware definition data poses a problem only to said mobile computing device and not to said fixed location computing device.

* * * * *